(12) United States Patent
Sharp et al.

(10) Patent No.: US 10,082,675 B2
(45) Date of Patent: *Sep. 25, 2018

(54) HIGH POWER HANDLING POLARIZATION SWITCHES

(71) Applicant: RealD Inc., Beverly Hills, CA (US)

(72) Inventors: Gary D. Sharp, Boulder, CO (US); Scott Gilman, Lyons, CO (US); David A. Coleman, Louisville, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/606,359

(22) Filed: May 26, 2017

(65) Prior Publication Data

US 2017/0351108 A1  Dec. 7, 2017

Related U.S. Application Data

(63) Continuation-in-part of application No. 15/464,745, filed on Mar. 21, 2017, which is a continuation of application No. 14/919,576, filed on Oct. 21, 2015, now Pat. No. 9,618,765.

(60) Provisional application No. 62/066,624, filed on Oct. 21, 2014.

(51) Int. Cl.
| | | |
|---|---|---|
| *G02F 1/1335* | (2006.01) | |
| *G02B 27/26* | (2006.01) | |
| *G02F 1/1347* | (2006.01) | |
| *G02F 1/01* | (2006.01) | |

(52) U.S. Cl.
CPC ........... *G02B 27/26* (2013.01); *G02F 1/0136* (2013.01); *G02F 1/13471* (2013.01); *G02F 1/133528* (2013.01)

(58) Field of Classification Search
CPC ................ G02F 1/13363; G02F 1/133528
See application file for complete search history.

(56) References Cited

U.S. PATENT DOCUMENTS

| | | |
|---|---|---|
| 4,281,341 A | 7/1981 | Byatt |
| 4,792,850 A | 12/1988 | Lipton |
| 5,564,810 A | 10/1996 | Larson |
| 5,991,074 A | 11/1999 | Nose et al. |

(Continued)

FOREIGN PATENT DOCUMENTS

| | | |
|---|---|---|
| EP | 860730 A2 | 8/1998 |
| EP | 1742492 A2 | 1/2007 |

(Continued)

OTHER PUBLICATIONS

International search report and written opinion of international searching authority for corresponding PCT application PCT/US2015/056754, dated Apr. 28, 2016.

(Continued)

*Primary Examiner* — Phu Vu
(74) *Attorney, Agent, or Firm* — Penny L. Lowry; Neil G. Mothew

(57) ABSTRACT

Liquid crystal devices are described that maintain performance of polarization/amplitude modulation under high irradiance conditions. Configurations that isolate polarizing elements under high thermal load are discussed which allow other elements, such as glass, which may be sensitive to stress birefringence to remain near optimum thermal conditions.

20 Claims, 9 Drawing Sheets

(56) References Cited

U.S. PATENT DOCUMENTS

| | | |
|---|---|---|
| 6,188,460 B1 | 2/2001 | Faris |
| 6,774,977 B1 | 8/2004 | Walton et al. |
| 6,975,345 B1 | 12/2005 | Lipton et al. |
| 7,477,206 B2 | 1/2009 | Cowan et al. |
| 7,528,906 B2 | 5/2009 | Robinson |
| 7,905,602 B2 | 3/2011 | Schuck et al. |
| 8,638,400 B2 | 1/2014 | Sharp et al. |
| 2002/0075202 A1 | 6/2002 | Fergason |
| 2004/0036821 A1* | 2/2004 | Paukshto ............ G02F 1/13471 349/74 |
| 2005/0140634 A1 | 6/2005 | Takatori |
| 2005/0248698 A1 | 11/2005 | Okamoto et al. |
| 2006/0061862 A1* | 3/2006 | Mi ....................... G02B 5/3058 359/485.05 |
| 2006/0082700 A1 | 4/2006 | Gehlsen et al. |
| 2006/0098285 A1 | 5/2006 | Woodgate et al. |
| 2006/0125774 A1 | 6/2006 | Nishigaki |
| 2006/0139524 A1* | 6/2006 | Chen ....................... B82Y 20/00 349/114 |
| 2006/0203338 A1 | 9/2006 | Pezzaniti |
| 2007/0008406 A1 | 1/2007 | Shestak et al. |
| 2007/0035672 A1 | 2/2007 | Shestak et al. |
| 2007/0126691 A1 | 6/2007 | Lin et al. |
| 2007/0195163 A1 | 8/2007 | Chestak et al. |
| 2007/0229951 A1 | 10/2007 | Jung et al. |
| 2008/0129930 A1 | 6/2008 | Little |
| 2008/0136762 A1 | 6/2008 | Fergason et al. |
| 2008/0211736 A1 | 9/2008 | Taira et al. |
| 2008/0218459 A1 | 9/2008 | Kim et al. |
| 2008/0239176 A1 | 10/2008 | Shestak et al. |
| 2008/0266388 A1 | 10/2008 | Woodgate |
| 2008/0291152 A1 | 11/2008 | Nakao et al. |
| 2008/0297671 A1 | 12/2008 | Cha et al. |
| 2008/0316303 A1 | 12/2008 | Chiu et al. |
| 2009/0102990 A1 | 4/2009 | Walton et al. |
| 2009/0153754 A1 | 9/2009 | Jung |
| 2009/0224646 A1 | 9/2009 | Kim et al. |
| 2010/0091227 A1 | 4/2010 | Chen et al. |
| 2010/0302353 A1 | 12/2010 | Lee |
| 2011/0032439 A1 | 2/2011 | Robinson et al. |
| 2014/0232948 A1 | 8/2014 | Sharp et al. |

FOREIGN PATENT DOCUMENTS

| | | |
|---|---|---|
| GB | 2354833 A | 9/1999 |
| JP | H08-015641 A | 1/1996 |
| JP | H10-142557 A | 5/1998 |
| JP | 2001-154640 A | 6/2001 |
| JP | 2002101427 A | 4/2002 |
| JP | 2003-202519 A | 7/2003 |
| JP | 2005-077437 A | 3/2005 |
| JP | 2007-279717 A | 10/2007 |
| JP | 2009-524106 A | 6/2009 |
| KR | 1020070006553 A | 1/2007 |
| KR | 100677637 B1 | 2/2007 |
| KR | 1020080024901 A | 3/2008 |
| KR | 1020090018528 A | 2/2009 |
| KR | 1020100023613 A | 3/2010 |
| WO | 2011-033684 A1 | 3/2011 |

OTHER PUBLICATIONS

Lin et al., "Surface Polarity Controlled Horizontal Chevron Defect Free Surface Stabilized Ferroelectric Liquid Crystal Devices", pp. 1003, SID 09 Digest (2009).

Kikuchi et al., "Optically Isotropic Nano-structured Liquid Crystal Composites for Display Applications", Digest of Technical Papers—Soc. for Info. Display Intl. Symposium, 40 (Bk. 2), pp. 578 (2009).

Suzuki et al., "Crosstalk-Free 3D Display with Time-Sequential OCB LCD", pp. 428, SID 09 Digest (2009).

* cited by examiner

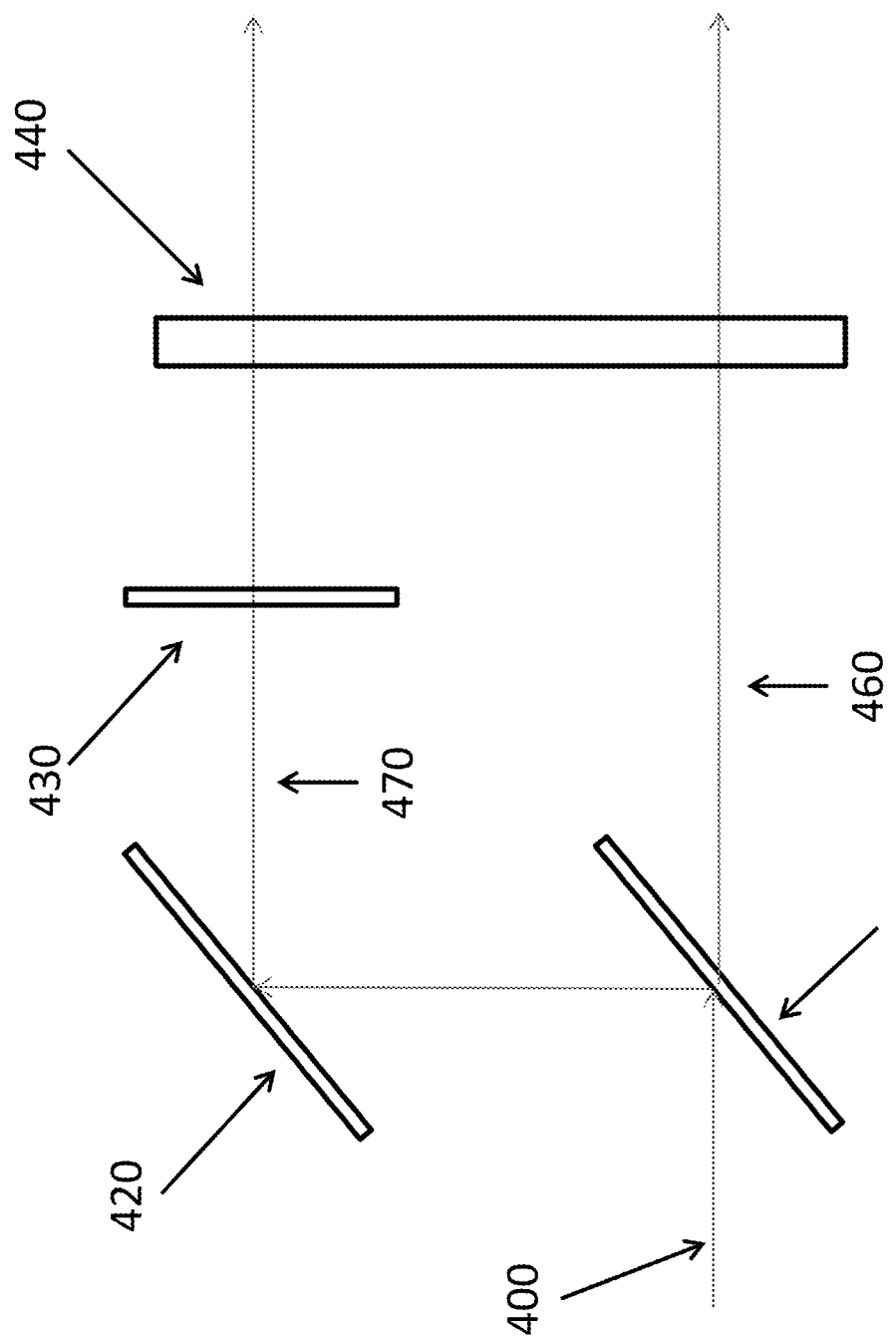

HIGH POWER HANDLING POLARIZATION SWITCHES

TECHNICAL FIELD

This disclosure generally relates to displays, and more specifically relates to stereoscopic flat panel displays having a liquid crystal (LC) modulation panel, and a polarization control panel (PCP).

BACKGROUND

Polarization switches are frequently used to temporally encode stereoscopic imagery for single-projector 3D projection display. An example is the ZScreen™, which may include a neutral linear input polarizer, followed by alternately engaged liquid crystal pi-cells. As the output from many projector models is substantially unpolarized, such as those based on the Texas Instruments DLP microdisplay, more than half of the energy is absorbed by the input polarizer of the polarization switch. This energy is dissipated in the optical assembly, resulting in localized heating. The polarization switch is usually assembled using optical adhesives to eliminated air-glass interfaces that produce light loss and degradation in performance (e.g. contrast and transmitted wavefront distortion). Localized heating in such an assembly causes a distribution in strain, usually resulting in significant birefringence that degrades performance. In 3D display, this is manifested as a loss in the stereo contrast ratio (SCR).

BRIEF SUMMARY

According to an aspect of the present disclosure, a polarization switch may include a first assembly operable to receive light. The first assembly may include a first end cap, a first polarizer located to receive light from the first end cap, a second end cap located to receive light from the first polarizer. The second assembly may be located to receive light from the first assembly, and may include a third end cap, a first cell located to receive light from the third end cap, a second cell located to receive light from the first cell, a fourth end cap located to receive light from the second cell, wherein a thermal isolation structure separates the first assembly from the second assembly. The thermal isolation structure may be in the approximate range of 0.5-10 mm. In some embodiments, the thermal isolation structure may be an air gap.

Further, the first end cap may be borofloat glass and may be coated with an anti-reflective coating. The thickness of the first, second, third and fourth end caps may be in the approximate range of 3-12 mm. The second end cap may be synthetic fused silica. The second assembly may further include a second polarizer. The first polarizer may be an iodine or a dye polarizer and the second polarizer may be a dye or an iodine polarizer. The first cell and the second cell may be liquid crystal cells, for example pi-cells. The second assembly may further include a first compensator located to receive light from the first cell, a second compensator located to receive light from the first compensator, and a third compensator located to receive light from the second cell. The first, second, and third compensators may be -C compensators.

According to another aspect of the present disclosure, a high power handling polarization system may include a first optical assembly operable to receive light. The first optical assembly may include a first substrate operable to receive light, a first polarizer adjacent to the first substrate and operable to receive light from the first substrate, and a planarization layer adjacent to the first polarizer. The high power handling polarization system may also include a second optical assembly operable to receive light from the first optical assembly. The second optical assembly may include a second substrate located to receive light from the planarization layer of the first optical assembly, a first liquid crystal cell located subsequent in the light path to the second substrate, a second liquid crystal cell located to receive light from the first liquid crystal cell, a third substrate located subsequent in the light path to the second liquid crystal cell and a thermal isolation structure may be located between the first optical assembly and the second optical assembly. The thickness of the thermal isolation structure may be in the approximate range of 0.5-10 mm. In some embodiments, the thermal isolation structure may be an air gap. The second optical assembly may also include a second polarizer located to receive light from the second substrate, wherein the second polarizer may be a dye or an iodine polarizer and the first polarizer in the first optical assembly may be a dye or an iodine polarizer. Further, the first and second polarizers may be dye polarizers, iodine polarizers, or any combination thereof.

Additionally, the first second and third end caps may be borofloat glass and the first and second liquid crystal cells may be pi-cells. The planarization layer may be coated with an anti-reflective coating and may be approximately index-matched to the first polarizer substrate. Also, the second optical assembly may include a first and second compensator located between the first and second liquid crystal cells and a third compensator located after the second liquid crystal cell, and before the third end cap, wherein the first, second, and third compensators may be -C compensators, for example Zeon 250.

According to another aspect of the present disclosure, liquid crystal devices are described that maintain performance of polarization/amplitude modulation under high irradiance conditions. Configurations that isolate polarizing elements under high thermal load are discussed which allow other elements, for example, glass, that are sensitive to stress birefringence to remain near optimum thermal conditions.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which:

FIGS. 4A, 4B, and 4C are schematic diagrams illustrating optical systems that employ the high power handling polarization switches.

DETAILED DESCRIPTION

Figure 1:
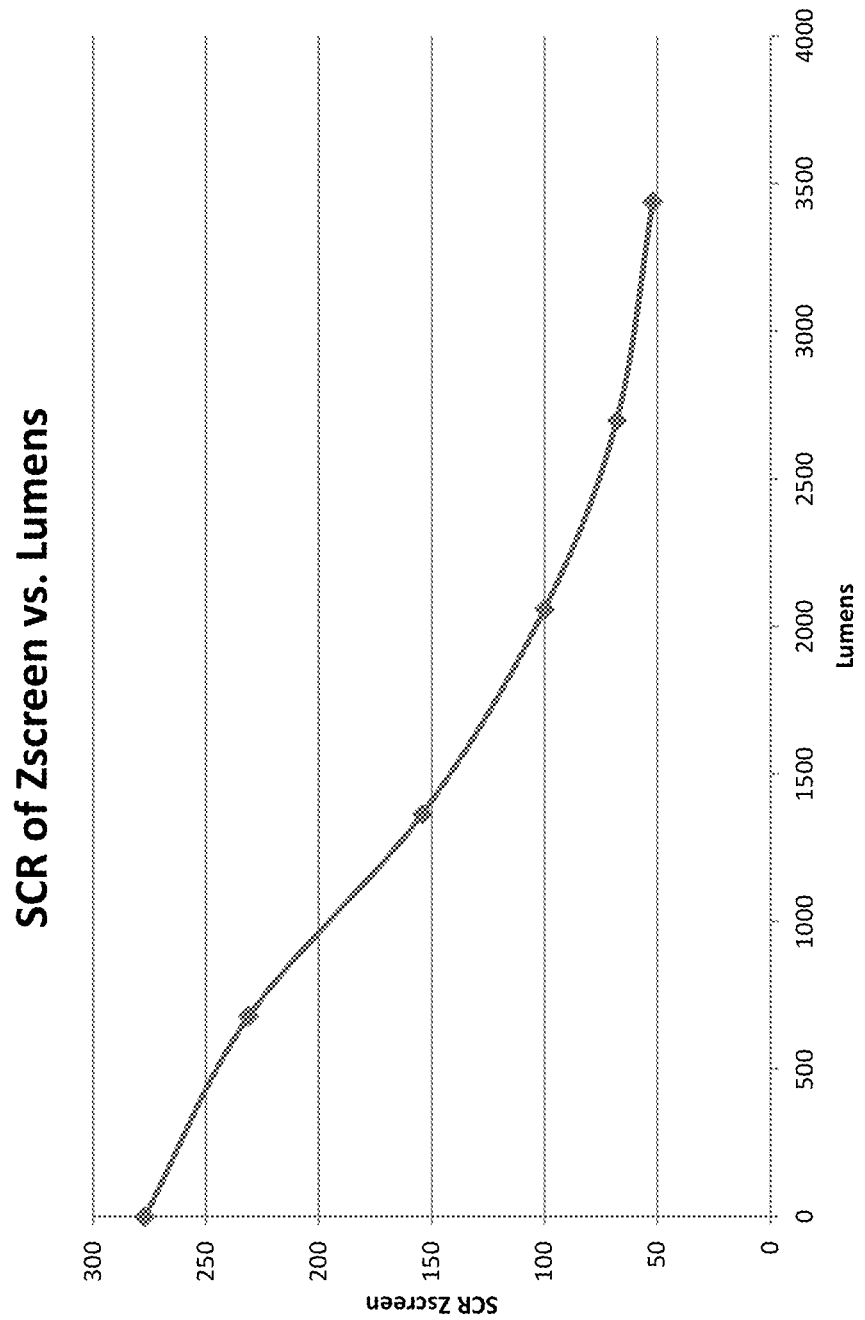
FIG. 1 is a schematic diagram illustrating the loss in stereo contrast ratio with lumens incident on a cinema polarization switch, in accordance with the present disclosure.

Polarization switches are frequently used to temporally encode stereoscopic imagery for single-projector 3D projection display. An example is the ZScreen™, which may include a neutral linear input polarizer, followed by alternately engaged liquid crystal pi-cells. As the output from many projector models is substantially unpolarized, such as those based on the Texas Instruments DLP microdisplay, more than half of the energy is absorbed by the input polarizer of the polarization switch. This energy is dissipated in the optical assembly, resulting in localized heating. The polarization switch is usually assembled using optical adhesives to eliminated air-glass interfaces that produce light loss and degradation in performance, for example, contrast and transmitted wavefront distortion. Localized heating in such an assembly causes a distribution in strain, usually resulting in significant birefringence that degrades performance. In 3D display, this is manifested as a loss in the stereo contrast ratio (SCR). The SCR is the ratio of luminance of the intended image transmitted through the 3D eyewear lens, to that intended for the other eye. Optical assemblies that optimize SCR and other optical performance characteristics can be produced using embodiments of the present disclosure.

According to an aspect of the present disclosure, a polarization switch may include a first assembly operable to receive light. The first assembly may include a first end cap, a first polarizer located to receive light from the first end cap, a second end cap located to receive light from the first polarizer. A second assembly may be located to receive light from the first assembly, and may include a third end cap, a first cell located to receive light from the third end cap, a second cell located to receive light from the first cell, a fourth end cap located to receive light from the second cell, wherein a thermal isolation structure separates the first assembly from the second assembly. The thermal isolation structure may be in the approximate range of 0.5-10 mm.

Further, the first end cap may be borofloat glass and may be coated with an anti-reflective coating. The thickness of the first, second, third and fourth end caps may be in the approximate range of 3-12 mm. The second end cap may be synthetic fused silica. The second assembly may further comprise a second polarizer located to receive light from the third end cap. The first polarizer may be an iodine or a dye polarizer and the second polarizer may be a dye or an iodine polarizer. The first cell and the second cell may be liquid crystal cells, for example pi-cells. The second assembly may further comprise a first compensator located to receive light from the first cell, a second compensator located to receive light from the first compensator, and a third compensator located to receive light from the second cell. The first, second, and third compensators may be -C compensators.

According to another aspect of the present disclosure, a high power handling polarization system may include a first optical assembly operable to receive light. The first optical assembly may include a first substrate operable to receive light, a first polarizer adjacent to the first substrate and operable to receive light from the first substrate, and a planarization layer adjacent to the first polarizer. The high power handling polarization system may also include a second optical assembly operable to receive light from the first optical assembly. The second optical assembly may include a second substrate located to receive light from the planarization layer of the first optical assembly, a first liquid crystal cell located subsequent in the light path to the second substrate, a second liquid crystal cell located to receive light from the first liquid crystal cell, a third substrate located subsequent in the light path to the second liquid crystal cell and a thermal isolation structure located between the first optical assembly and the second optical assembly. The thickness of the thermal isolation structure may be in the approximate range of 0.5-10 mm. The second optical assembly may also include a second polarizer located to receive light from the second substrate, wherein the second polarizer may be a dye or an iodine polarizer and the first polarizer in the first optical assembly may be a dye or an iodine polarizer. Further, the first and second polarizers may be dye polarizers, iodine polarizers, or any combination thereof.

Additionally, the first second and third end caps may be borofloat glass and the first and second liquid crystal cells may be pi-cells. The planarization layer may be coated with an anti-reflective coating and may be approximately index-matched to the first polarizer substrate. Also, the second optical assembly may include a first and second compensator located between the first and second liquid crystal cells and a third compensator located after the second liquid crystal cell, and before the third end cap, wherein the first, second, and third compensators may be -C compensators, for example Zeon 250.

According to another aspect of the present disclosure, liquid crystal devices are described that maintain performance of polarization/amplitude modulation under high irradiance conditions. Configurations that isolate polarizing elements under high thermal load are discussed which allow other elements, for example, glass, that are sensitive to stress birefringence to remain near optimum thermal conditions.

These and other advantages and features of the present disclosure will become apparent to those of ordinary skill in the art upon reading this disclosure in its entirety.

FIG. 1 is a schematic diagram illustrating the loss in stereo contrast ratio with lumens incident on a cinema polarization switch. In FIG. 1, the cinema polarization switch may be a theatrical ZScreen™. Zscreens are generally discussed at least in commonly owned U.S. Pat. No. 4,792,850 and U.S. Pat. No. 7,477,206 both of which are herein incorporated by reference in their entireties. FIG. 1 shows the impact of localized heating of a 3D polarization switch when used with a DLP-based digital cinema projector. As the lumen output is increased, so too is the thermal loading on the optical assembly. The associated strain produces stress-birefringence in the glass that degrades the precise polarization control needed to maintain SCR. Stress birefringence in any glass subsequent to the input polarizer contributes to this degradation. This includes the liquid crystal cells, and any exit end-cap needed for optical performance. The figure shows that significant loss in SCR occurs for typical lumen outputs needed to achieve brightness standards on average sized cinema screens. When combined with SCR losses associated with other elements of the system, the result is ghosting that is beyond acceptable levels. Research has shown that reduced SCR produces loss in perceived image depth, and even visual discomfort.

Sheet polarizer is typically composed of a functional PVA layer bounded by TAC protective films. The polarizer is frequently bonded to one glass layer, for example, the input glass endcap, using a pressure-sensitive adhesive, with the other surface of the polarizer buried in the optical assembly using a thermoset or UV cure adhesive. The refractive indexes of the TAC, glass, and adhesives are nearly matched, so the transmitted wavefront distortion of the assembly can be quite good.

Conventional sheet polarizer is fabricated using web-based processes, which make it difficult to achieve a low transmitted wavefront distortion (TWD). Undulations in the local optical path-length through the structure cause TWD, which is easily observed in a free-standing film measurement. Moreover, irregularity can be observed in reflection (single-side bonded) due to the surface profile, with larger scale flatness issues frequently introduced from the lamination process. However, when both surfaces are index matched between optically-flat glass, these issues are reduced to an acceptable level.

In most instances, dichroic sheet polarizer used in thermally demanding situations requires more durable dye-stuff chemistry, versus more common iodine chemistry. Dye-type polarizers can withstand higher temperatures, though their efficiencies, such as internal transmission efficiency and polarizing efficiency, tend to be lower than iodine polarizer. Reducing polarizing efficiency also reduces the stereo contrast ratio, while loss in internal transmission degrades the 3D image brightness. Frequently, dye polarizers suffer lower transmission in the blue portion of the spectrum, so system losses can exceed those anticipated by photopic polarizer measurements due to additional color-balance losses. The use of dye-type polarizer for reliability reasons can result in an undesirable tradeoff situation between SCR and image brightness.

Methods for extracting heat from prior art polarization switches are marginally successful. Fans can be used to move air over external surfaces, which can somewhat mitigate against performance loss concerns, and increase the power density that the product can handle before catastrophic failure. However, because the absorbing layer, which may be typically about 25-microns of PVA, may be buried in substantial thickness of glass which has very poor thermal conductivity, such measures do not solve the thermal loading problem.

The polarizer can be thermally isolated from the subsequent elements, for example by producing two air-spaced structures. The polarizer and subsequent functional elements of the polarization switch, for example, the liquid crystal cells and any compensation films, can be separately laminated between AR-coated flat-glass endcaps, with a thermal isolation structure, such as an air-space, introduced between them. This can in principle substantially reduce stress birefringence while maintaining a high degree of optical performance. In many instances, the glass endcaps are quite thick, for example, approximately 3-12 mm, as needed to maintain the transmitted wavefront distortion, and are composed of borofloat glass. As such, the exit endcap of the polarizer laminate and the entrance endcap of the subsequent assembly have the potential to introduce their own stress-birefringence. Of particular concern is the former, which resides directly adjacent the absorptive polarizer.

Preferred embodiments are enabling in that they; (1) substantially eliminate stress birefringence problems produced by polarizer thermal loading; (2) achieve a high degree of optical performance (e.g. low transmitted wavefront distortion); and (3) substantially eliminate the tradeoff between image brightness and stereo contrast ratio (SCR).

The function of endcaps is to provide a carrier substrate for external antireflection coatings, which may substantially eliminate reflections at the input/output thermal isolation structure-glass interfaces, and to provide the desired consistency in local integrated optical path-length through the assembly. Even thin polished glass, index-matched to the polarizer surface, can be quite effective at reducing irregularity. However, thin glass is easily distorted in the lamination process, and as such, reductions in irregularity can be accompanied by (even more serious) introduction of optical power. This is associated with non-uniformity in the thickness of the optical adhesive enabled by the compliance of the substrate. When polarization-switch aperture sizes are required to be large, substrates in the approximately 3-12 mm range are often used to ensure that no bending occurs in the lamination process that can otherwise produce optical power.

Liquid crystal polarization switches used for 3D projection have prescribed retardation values that represent a lock-and-key relationship between it and the eyewear. Any retardation introduced via thermal loading disrupts that relationship, resulting in a ghost image. The amount of retardation induced in a substrate is proportional to four important parameters; the temperature distribution (thermal gradient), the coefficient of thermal expansion, the stress-optic coefficient, and the thickness. The cone of light passing through a polarization switch produces higher power density in the center, and thus a higher concentration of heat in the center. This heat produces a strain distribution that for most glasses results in significant retardation. The poor thermal conductivity of glass, the non-uniform absorption of over half the luminous output of the projector, and the substantial thicknesses typically required to maintain flatness, are all problematic for keeping optical retardation under control for conventional glasses. Typical glass used for optical substrates has a CTE in the approximate range of 5-10 ($\times 10^{-6}$/° C.), in which fused-silica has a CTE roughly an order of magnitude smaller. Other materials may have more typical glass CTE values, but have unusually low stress-optic coefficients (2-10 ($\times 10^{-8}$ mm$^2$/N). Frequently, these are glasses with high lead content, which can pose environmental compliance issues. Fused silica has a fairly typical stress-optic coefficient (3-4$\times 10^{-6}$/° C.), but has low optical absorption and low CTE, and is readily available in large pieces, so it is an appropriate substrate.

Figure 2A:
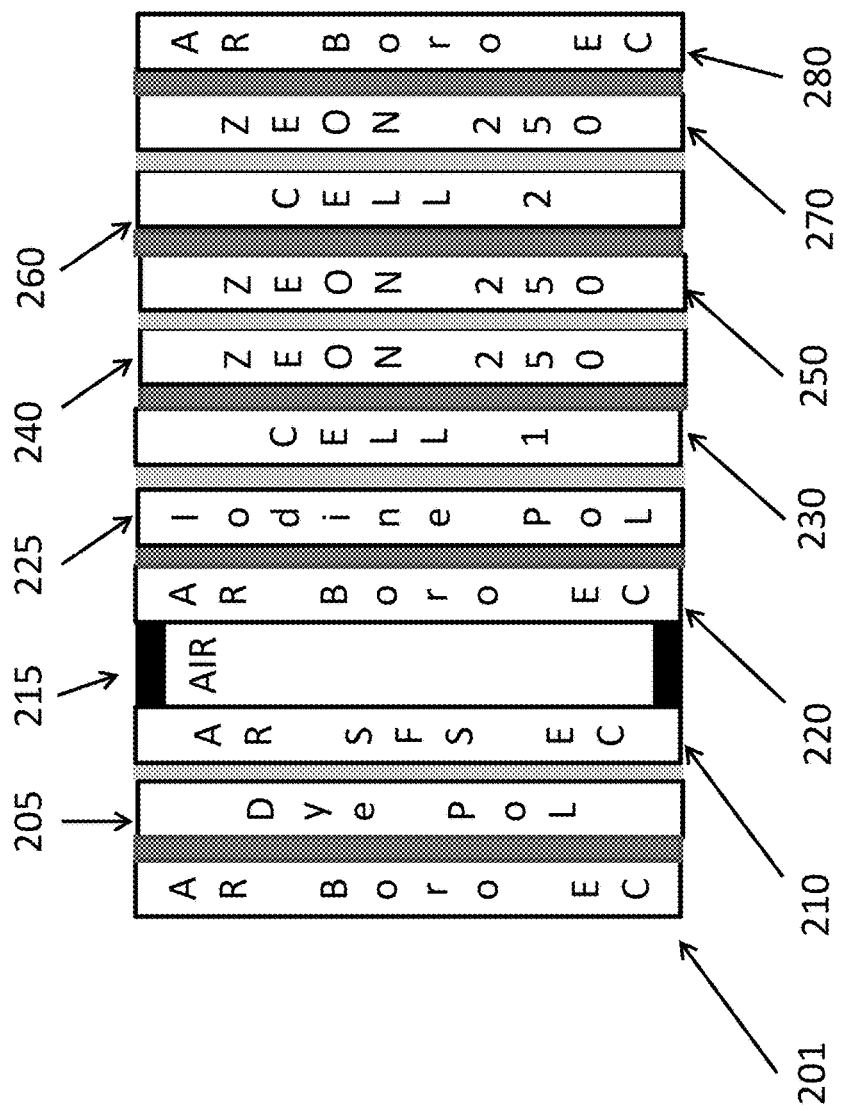
FIGS. 2A and 2B are schematic diagrams illustrating two configurations for high power handling polarization switches, in accordance with the present disclosure.
Figure 2B:
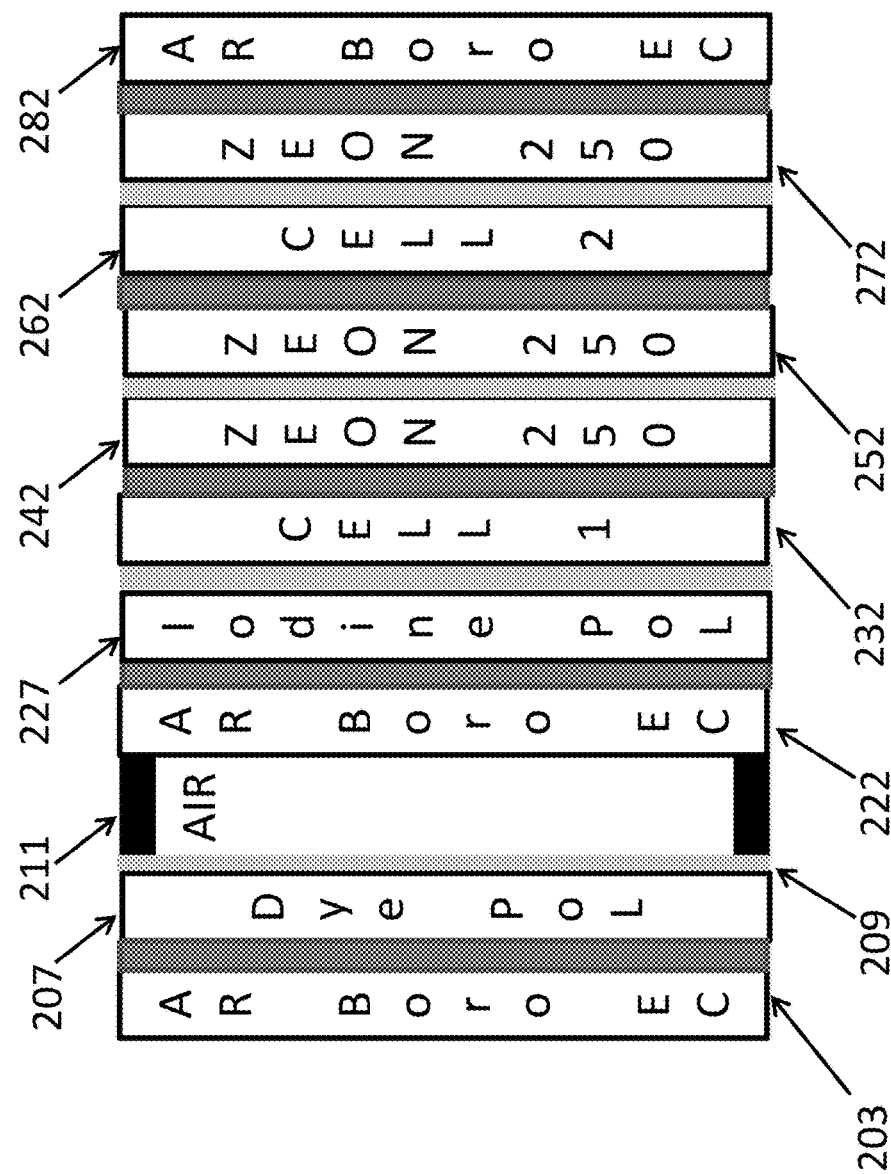

FIGS. 2A and 2B are schematic diagrams illustrating two configurations for high power handling polarization switches, including, but not limited to, Zscreens. FIGS. 2A and 2B may be part of an optical system which may include a polarizing beam splitter, a rotator, and a reflector. This optical system may generally be discussed in commonly owned U.S. Pat. No. 7,905,602, which is herein incorporated by reference in its entirety. FIGS. 2A and 2B include two assemblies: the input assembly which may be responsible for creating partially/fully polarized input light, and the second assembly may manipulate or modulate the linear state of polarization, either passively or actively. In both FIGS. 2A and 2B, the two assemblies may be spaced apart from one another by an air gap. The air gap or other thermal isolation structure may be in the approximate range of 0.5-10 mm thick.

As illustrated in FIGS. 2A and 2B, the first assembly or the input assembly may include a linear polarizer which may have at least an input end cap and in some cases an output end cap before the air gap. The second assembly may include two liquid crystal cells or pi-cells to manipulate or modulate the light. In some cases, a clean-up polarizer may be located prior to both of the liquid crystal cells. Further, the second assembly may include an end cap located adjacent to the air gap and before the first liquid crystal cell, or before the polarizer should the polarizer be included in the second assembly. Additionally, another end cap may be located after the second liquid crystal cell. Moreover, the first assembly may receive light from a polarizing beam splitter in which the light may be transmitted through the polarizing beam splitter and/or reflected from the polarizing beam splitter. In some embodiments, the polarizing beam splitter may be a MacNeille polarizing beam splitter or a wire grid polarization beam splitter.

FIGS. 2A and 2B may receive light at the input end cap before the linear polarizer. After the light propagates through the input end cap and the linear polarizer, the light may encounter the air gap. The next end cap may receive the light from the air gap and direct the light to one of the polarizer or the first liquid crystal cell. The light may then be directed from the first liquid crystal cell to the second liquid crystal cell and then exit the last end cap. As illustrated in FIGS. 2A and 2B, there may be -C compensators located between the first liquid crystal cell and after the second liquid crystal cell.

FIG. 2A illustrates a first end cap 201, a first polarizer 205, a second end cap 210, an air spaced gap 215, a third end cap 220, a second polarizer 225, a first cell 230, a first compensator 240, a second compensator 250, a second cell 260, a third compensator 270, and a fourth end cap 280.

In FIG. 2A, the first assembly includes a first end cap 201 which may be an input flat glass substrate, which may be anti-reflective coated (AR coated). Because this substrate is up-stream in the light path from the polarizer, it need not maintain a low level of birefringence under thermal load. The first end cap 201 can be relatively inexpensive glass in sufficient thickness needed to maintain flatness under load. The thickness of the end cap may be in the approximate range of 3-12 mm thick. However, the first end cap 201 may be sufficiently mechanically stable that it remains flat and does not introduce stress birefringence in elements subsequent to the polarizer. Acceptable birefringence in the glass or end cap may be in the approximate range of 5 nm/cm. This first end cap 201 or glass substrate is followed by a first polarizer 205 which may be a high-durability linear polarizer which creates substantially polarized light. This polarizer may be a high transmission dye-type polarizer with a polarizing efficiency that is insufficient as a stand-alone polarizer. That is, it is anticipated that a "clean-up" polarizer is contained in the second assembly, such that the combination has better polarizing efficiency than is possible with a single high polarizing efficiency dye-type polarizer. The polarizing efficiency may be greater than 99.99% or an SCR of greater than 1000:1. Although the second polarizer or clean-up polarizer of FIGS. 2A and 2B may be included in the second assembly, in another embodiment, the second polarizer or clean-up polarizer of FIGS. 2A and 2B may not be a part of the second assembly, for example when a polarizing beam splitter is employed in the optical system. Additionally, the second polarizer of clean-up polarizer may not be part of the second assembly whether or not a polarizing beam splitter is employed in the optical system.

The first assembly of FIG. 2A may include the first end cap 201, the first polarizer 205, and the second end cap 210. In the first assembly of FIG. 2A, the first polarizer 205 may be followed by a second end cap 210 or second bulk substrate, possibly similar in form-factor to the first end cap 201 or input substrate, but using a different material. The second end cap 210 may be composed of a material with relatively low coefficient of thermal expansion (CTE), relatively low stress-optic coefficient, or a combination of each. An exemplary material is synthetic fused-silica (SFS), which has a CTE of approximately 5-10 ($\times 10^{-7}$/° C.), and a stress-optic coefficient of approximately ($3-4 \times 10^{-6}$/° C.). When absorption occurs in the first polarizer 205, raising the local temperature, the result is relatively low substrate retardation, even when using thick substrates. Low substrate retardation may be approximately 5 nm.

The first end cap 201, first polarizer 205, and second end cap 210 of the first assembly of FIG. 2A are approximately index matched together, typically with an optical adhesive. For example, the index of the end cap, first polarizer and second end cap may be within approximately 0.05 of one another. Desirable properties of the adhesive, apart from meeting mechanical/durability requirements include water-white transmission, low-haze, low durometer (which may be needed to, for example, isolate the different thermo-mechanical properties of the three substrates), and a refractive index that approximately matches the three elements of the first assembly.

Continuing the discussion of the embodiments of FIG. 2A, the first and second assemblies may be spaced apart by an air gap 215. The second assembly of FIG. 2A may include the third end cap 220, the second polarizer 225, the first cell 230, the first and second compensators 240, 250 respectively, the second cell 260, the third compensator 270, and the fourth end cap 280. In the second assembly, the first and second cell 230, 260, respectively, may be liquid crystal cells, for example pi cells. The first, second, and third compensators 240, 250, and 270, respectively, may be -C compensators, and may each be Zeon 250 -C compensators. The compensators may be in the approximate range of 200-300. The compensators may improve contrast, among other things, for wide field of view circumstances.

In the second assembly of FIG. 2A, the second polarizer 225 may be a clean-up polarizer which may absorb a small amount of residual light from the first assembly as needed to obtain a desired degree of polarization. This produces a very pure linear state of polarization, but with very little thermal loading on the second assembly. Due to the low absorption, the second polarizer 225 or the clean-up polarizer may be a less durable iodine polarizer, which can have the desirable properties of flat spectral response, and high internal transmission, in the approximate range of 96-99%, enabled by iodine chemistry and the low polarizing efficiency tolerable when using a pair of polarizers. Moreover, the low thermal loading on the second assembly may allow the third end cap 220 or entrance substrate to be a lower cost borofloat glass. In practice, absorption at the level of, for example approximately 2% produces very little heat, and therefore very little stress birefringence on the entrance substrate, liquid crystal glass substrates, and the exit substrate. In a preferred embodiment, the temperature rise due to light absorption is sufficiently low that the entire second assembly can be built using inexpensive glass, for example borofloat. For example, the temperature rise may be in the approximate range of less than 10 degrees C.

FIG. 2B may include a first assembly and a second assembly. Further, the first assembly of FIG. 2B may include a first end cap 203, a first polarizer 207, and a planarization layer 209. The first and second assembly may be separated by an air gap 211. The second assembly of FIG. 2B may include a second end cap 222, a second polarizer 227, a first cell 232, a first compensator 242, a second compensator 252, a second cell 262, a third compensator 272, and a third end cap 282. In different embodiments, the first and second polarizer may be either a dye polarizer or an iodine polarizer, or any other appropriate polarizer, or any combination thereof. In the embodiment of only a first polarizer, the first polarizer may be either a dye or an iodine polarizer, or any other appropriate polarizer.

The first assembly of FIG. 2B may include the first end cap 203 and first polarizer 207. In the first assembly of FIG. 2B, the second end cap 210 or the exit substrate as illustrated in FIG. 2A, may be eliminated in the first assembly of FIG. 2B, and a thin (likely AR coated) planarization layer 209 may replace it. The planarization layer is substantially index-matched to the polarizer substrate and may include a UV cure resin that is cast onto the polarizer surface. This layer is typically in the approximate range of 20-100 microns in thickness, but it eliminates the air-polarizer interface, functionally removing irregularity without requiring a bulk substrate (and the associated cost and thickness). This planarization layer 209 may additionally be polished to achieve the appropriate flatness. This material may be an acrylic with a fairly high durometer, as may be needed to avoid scratching when it is handled or cleaned. It may further have a high glass transition temperature and particular surface chemistry as may be required to deposit a high quality AR coating. For example, the durometer may be approximately 90 shore A and the glass transition temperature may be approximately 100 degrees C.

A benefit of the planarization layer 209 in FIG. 2B, may be that it reduces the substrate thickness by a ratio of 1,000×-5,000×, while still performing the desired optical function. This reduces the retardation by a similar factor, and also helps overcome the thermal conductivity problem responsible for trapping heat at the polarizer. Such heat is responsible not only for retardation, but for determining the optical damage threshold. When lumen density is sufficient to drive the polarizer temperature above 90 C, even high-durability dye polarizers can fail. By eliminating the thick exit substrate, external heat extraction methods, for example fans, can be more effective, thereby reducing the polarizer temperature when light fluxes are high. Filtered air can be pushed through the channel between the exit polarizer substrate and the input substrate of the second assembly, which effectively discharges the heat accumulated at the polarizer.

There are several manufacturing methods for producing a planarization layer. In an exemplary method, the polarizer film may be first laminated to the first end cap or entrance substrate using a pressure sensitive adhesive (PSA). The polarizer may have surface treatments, hard coats, or may have surface activation using, for example plasma treatment, to promote strong adhesion to the planarization layer. A liquid resin may be dispensed onto the polarizer and a flat casting mold is pressed into the resin, distributing it over the polarizer surface. The casting mold may be treated with a mold-release material to discourage bonding when cured. The casting mold may be composed of a polished glass material, which is transparent to UV radiation. After the desired resin thickness is obtained, with the casting mold aligned approximately parallel to the input substrate, the resin is exposed to UV radiation, curing it. The casting mold is released from the resin using a mechanical or thermal process, exposing a resin surface that is conformal to the flatness of the casting mold. This surface can then have additional coatings applied, such as AR coatings.

The second assembly illustrated in FIG. 2B may include elements that passively or actively manipulate the state of polarization of light exiting the first assembly. In the example of FIGS. 2A and 2B, the second assembly may include at least an entrance substrate, followed by a clean-up polarizer, two liquid crystal pi-cells, and an exit substrate. As illustrated FIG. 2B may also include first and second compensators 242 and 252, respectively between the first cell 232 and the second cell 262. Furthermore, there may be a third compensator 272 located subsequent to the second cell 262 along the light path. The compensators may be -C compensators, for example Zeon 250 compensators.

One difference between FIGS. 2A and 2B is that the first assembly of FIG. 2A may have a bulk SFS substrate, and the first assembly of FIG. 2B may have a planarization layer. These elements may all be adhesively bonded using index-matched adhesives.

Additionally, as illustrated in FIGS. 2A, 2B, 4A, 4B, and 4C when a polarizing beam splitter is employed or is not employed in the optical system, the first polarizer may be a dye polarizer, an iodine polarizer, or any other appropriate polarizer. Further, when a polarizing beam splitter is employed or is not employed in the optical system, the second polarizer of FIGS. 2A and 2B may be removed when a polarizing beam splitter is employed in the optical system.

Figure 3:
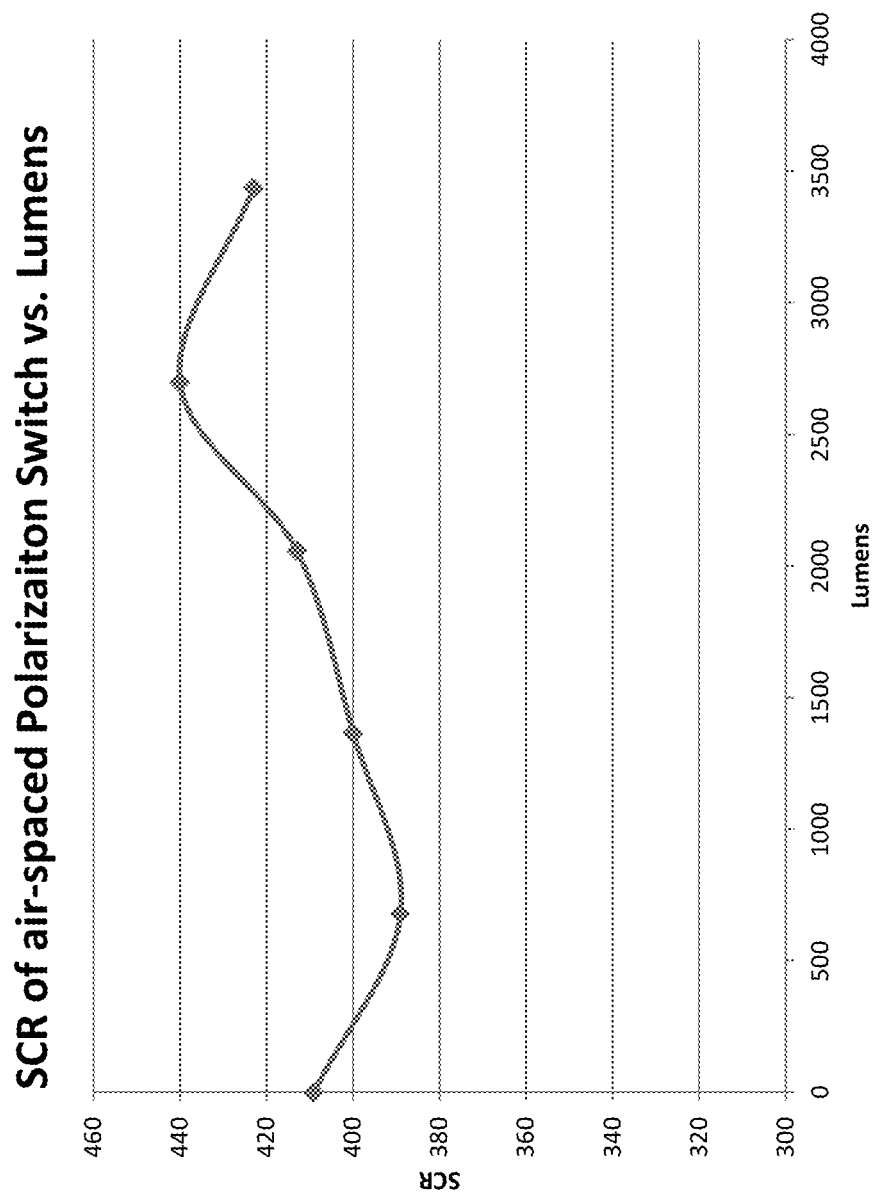
FIG. 3 is a schematic diagram illustrating stability of a high power handling polarization switch under the lumen loading of FIG. 1, in accordance with the present disclosure.

FIG. 3 is graph illustrating the stability of the stereo-contrast-ratio (SCR) for the air-spaced polarization switch of FIG. 2A under lumen loading. FIG. 3 illustrates substantial preservation of the SCR as the lumen loading is increased, versus the case of FIG. 1 for a conventional polarization switch. In addition to the elements discussed previously, the assemblies may include additional films that manipulate the state of polarization. For example, retardation films can be used to enhance the field of view, as described in commonly owned U.S. Pat. No. 8,638,400, which is herein incorporated by reference in its entirety. Like glass substrates, retardation films can similarly be susceptible to stresses caused by thermo-mechanical loading. This loading may be due to the lamination process, differential CTE, which may exist even in thermal equilibrium, and non-uniform heating due to light flux distributions. A preferred substrate is based on COP or COC substrates, which tend to be relatively immune to such stresses, versus retardation films based on (e.g.) polycarbonate (PC).

Figure 4A:
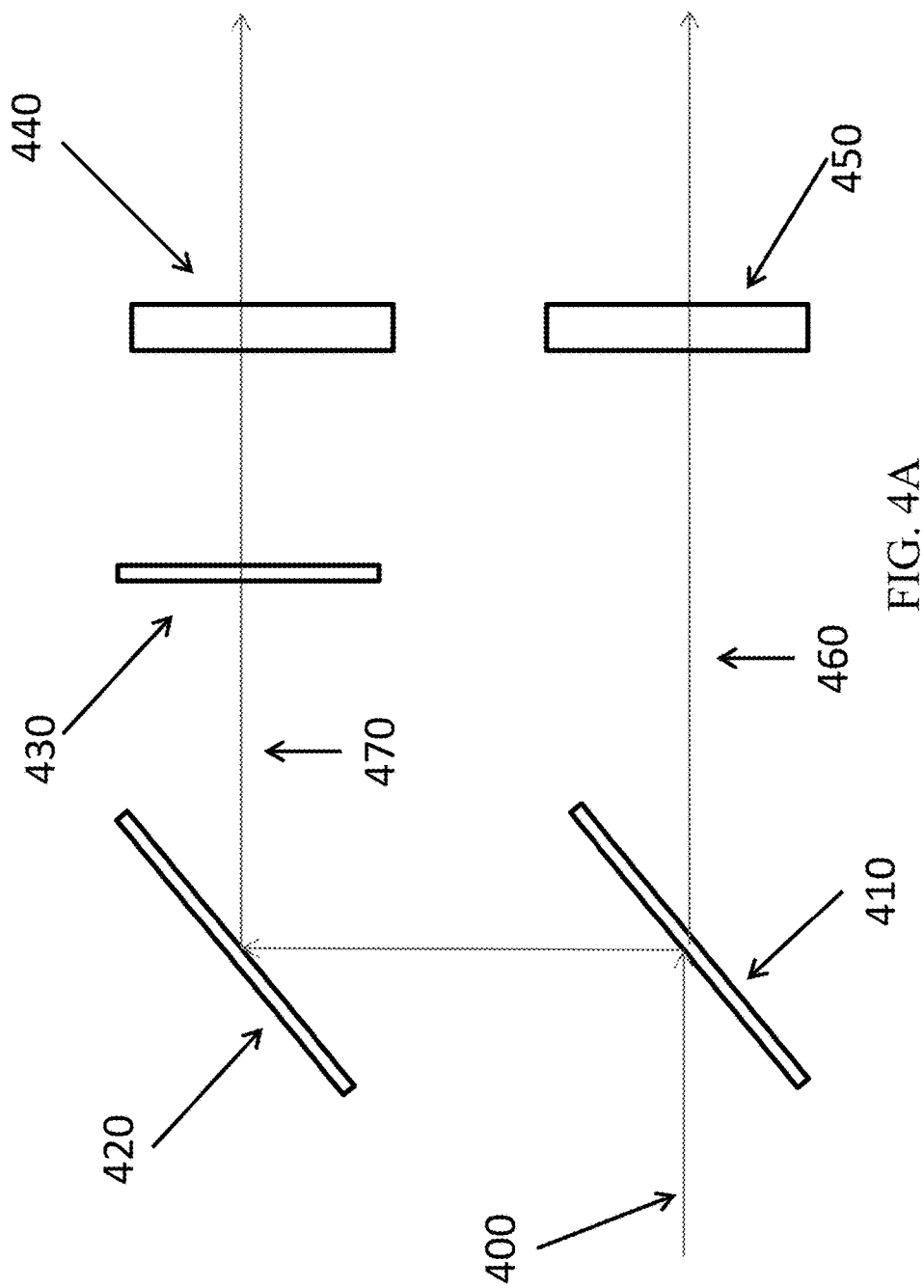
Figure 4C:
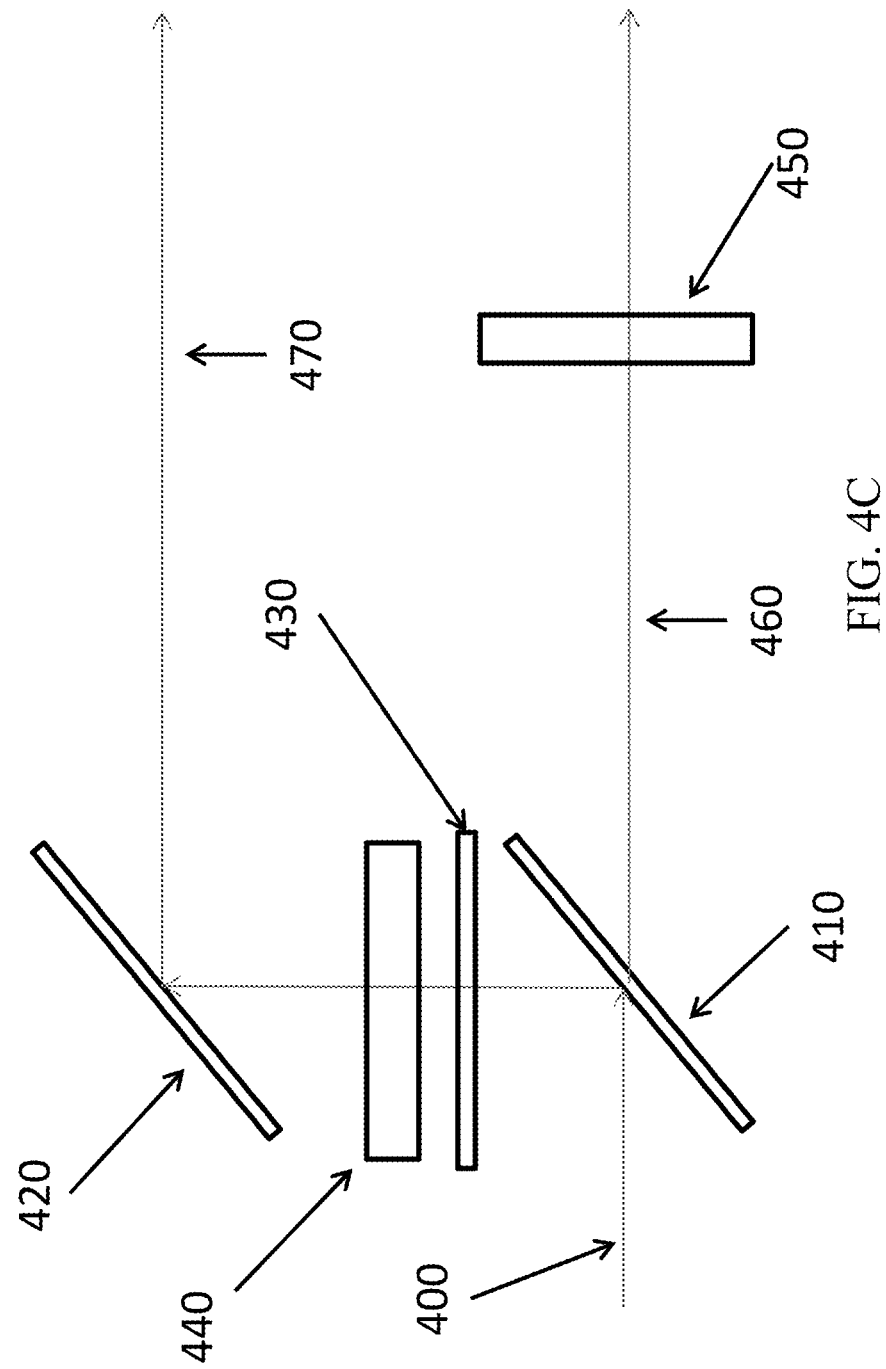

FIGS. 4A, 4B, and 4C are schematic diagrams illustrating optical systems that employ the high power handling polarization switches. FIG. 4A illustrates input image light 400 that may be received by a polarization beam splitter 410. The polarization beam splitter (PBS) may alternatively be a MacNeille PBS or a wire grid PBS. The PBS 410 may transmit light along a first light path 460 and reflect light to a reflector 420 along a second light path 470. In FIG. 4A, the light on the first light path 460 may encounter a first polarization switch 450 which may be either of the embodiments previously discussed in FIGS. 2A and 2B. Further, the light on the second light path 470 may be passed to a rotator 430 which may be a half wave plate, and then the light may be directed to a second polarization switch 440. The second polarization switch 440 may also be either of the embodiments discussed in FIGS. 2A and 2B. Generally, the first and second polarization switches may be similar embodiments, for example, the first and second polarization switches of FIG. 4A, may both be the embodiment of FIG. 2B.

FIG. 4B illustrates input image light 400 that may be received by a polarization beam splitter 410. The polarization beam splitter (PBS) may alternatively be a MacNeille PBS or a wire grid PBS. The PBS 410 may transmit light along a first light path 460 and reflect light to a reflector 420 along a second light path 470. Further, the light on the second light path 470 may be passed to a rotator 430 which may be a half wave plate, and then the light may be directed to a polarization switch 440. The polarization switch 440 may be either of the embodiments discussed in FIGS. 2A and 2B.

FIG. 4C illustrates input image light 400 that may be received by a polarization beam splitter 410. The polarization beam splitter (PBS) may alternatively be a MacNeille PBS or a wire grid PBS. The PBS 410 may transmit light along a first light path 460. In FIG. 4C, the light on the first light path 460 may encounter a first polarization switch 450 which may be either of the embodiments previously discussed in FIGS. 2A and 2B. The light reflected from the PBS 410 may be passed to a rotator 430 which may be a half wave plate, and then the light may be directed to a second polarization switch 440. The second polarization switch 440 may also be either of the embodiments discussed in FIGS. 2A and 2B. After the light encounters the second polarization switch, the light may be passed to a reflector 420. Generally, the first and second polarization switches may be similar embodiments, for example, the first and second polarization switches of FIG. 4A, may both be the embodiment of FIG. 2B.

Figure 5A:
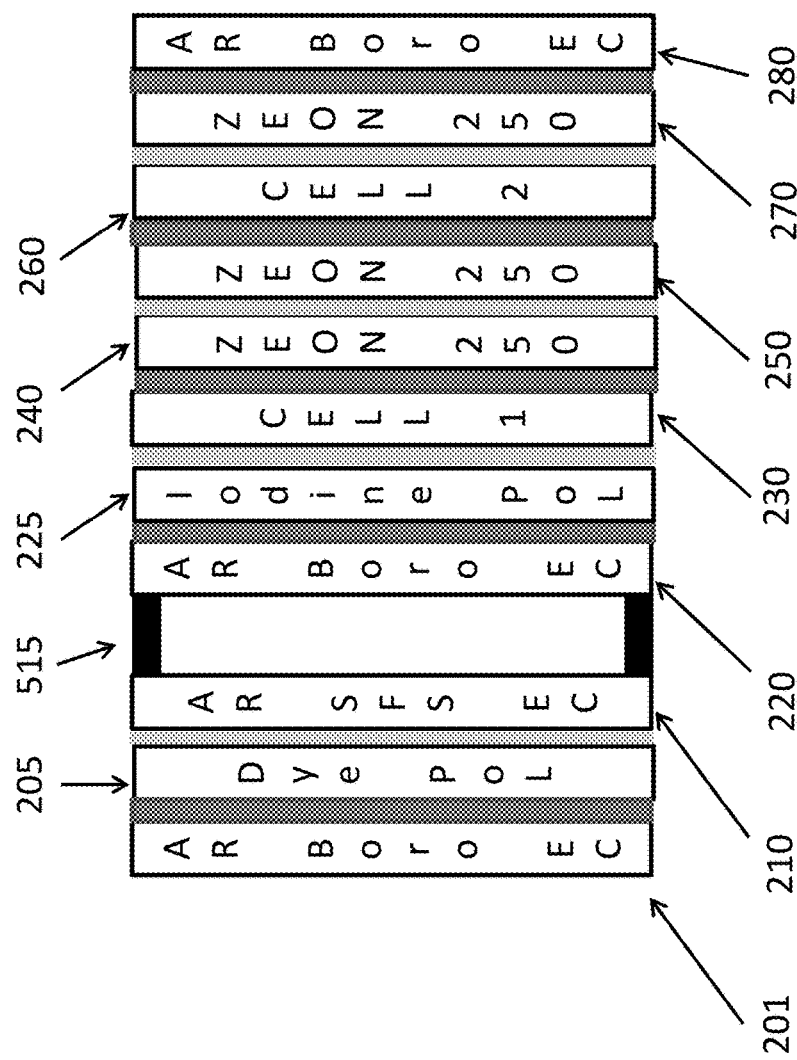
FIGS. 5A and 5B are schematic diagrams illustrating two configurations for high power handling polarization switches, in accordance with the present disclosure.
Figure 5B:
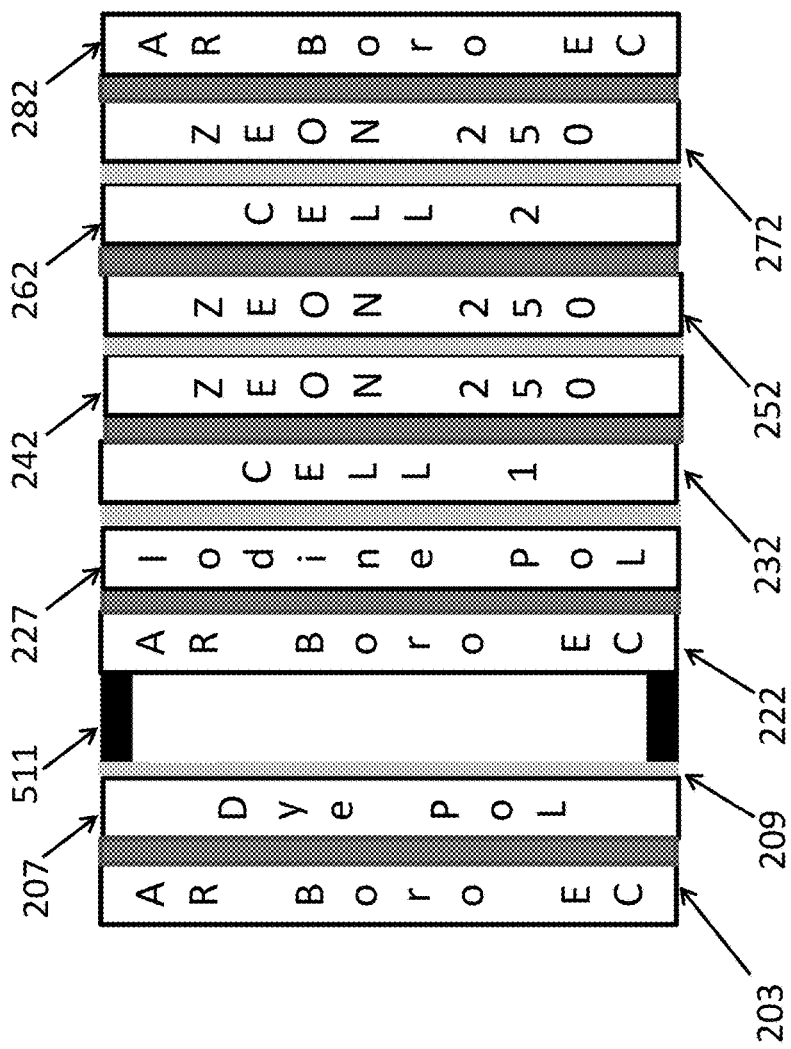

FIGS. 5A and 5B are schematic diagrams illustrating two configurations for high power handling polarization switches, including, but not limited to, Zscreens. FIGS. 5A and 5B may be part of an optical system which may include a polarizing beam splitter, a rotator, and a reflector. This optical system may generally be discussed in commonly owned U.S. Pat. No. 7,905,602, which is herein incorporated by reference in its entirety. FIGS. 5A and 5B include two assemblies: the input assembly which may be responsible for creating partially/fully polarized input light, and the second assembly may manipulate or modulate the linear state of polarization, either passively or actively. In both FIGS. 5A and 5B, the two assemblies may be thermally isolated from each other by an air gap or other thermal isolation structure 511, 515 made of non-heat conducting materials or low thermally conductive materials. These non- or low thermally conductive materials may be, for example, air, greases, oils, or other solids, fluids, or gases. Low thermal conductivity means that heat transfer occurs at a low rate across materials. The units of thermal conductivity, W/mK, are watts per square meter of a defined surface area for a temperature gradient of one Kelvin for every meter in thickness. The thermal isolation structure may be in the approximate range of 0.5-10 mm thick. Some example materials and their typical thermal conductivities are air (0.02 W/mK), acrylic (0.2 W/mK), epoxy (0.35 W/mK), glass (1.05 W/mK), and silicone oil (0.1 W/mK). In some embodiments, the thermal isolation structure 511, 515 may be made of low thermally conductive optically clear oils, greases, or adhesives. In some embodiments, the thermal isolation structure 511, 515 may be made of one or more layers of materials. The layers may be made of air, grease, oil, adhesive, or some other material.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

Embodiments of the present disclosure may be used in a variety of optical systems. The embodiment may include or work with a variety of projectors, projection systems, optical components, displays, microdisplays, computer systems, processors, self-contained projector systems, visual and/or audiovisual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

It should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A polarization switch, comprising:
   a first assembly operable to receive light, comprising:
      a first end cap;
      a first polarizer located to receive light from the first end cap;
      a second end cap located to receive light from the first polarizer;
   a second assembly located to receive light from the first assembly, comprising:
      a third end cap;
      a first cell located to receive light from the third end cap;
      a second cell located to receive light from the first cell;
      a fourth end cap located to receive light from the second cell;
   wherein a thermal isolation structure separates the first assembly from the second assembly.

2. The polarization switch of claim 1, wherein the first end cap is borofloat glass.

3. The polarization switch of claim 2, wherein the first end cap comprises an anti-reflective coating.

4. The polarization switch of claim 1, wherein the first polarizer is a dye polarizer.

5. The polarization switch of claim 1, wherein the second assembly further comprises a second polarizer located to receive light from the third end cap, and wherein the first cell is further located to receive light from the second polarizer.

6. The polarization switch of claim 5, wherein the second polarizer is an iodine polarizer.

7. The polarization switch of claim 1, wherein the first cell and the second cell are liquid crystal cells.

8. The polarization switch of claim 1, wherein the thickness of the first, second, third and fourth end caps are in the approximate range of 3-12 mm.

9. The polarization switch of claim 1, wherein the second end cap is synthetic fused silica.

10. The polarization switch of claim 1, wherein the second assembly further comprises a first compensator located to receive light from the first cell, a second compensator located to receive light from the first compensator, and a third compensator located to receive light from the second cell, wherein the second cell is further located to receive light from the second compensator, and wherein the fourth end cap is further located to receive light from the third compensator.

11. The polarization switch of claim 10, wherein the first, second, and third compensators are -C compensators.

12. The polarization switch of claim 1, wherein the thermal isolation structure is in the approximate range of 0.5-10 mm thick.

13. The polarization switch of claim 1, wherein the thermal isolation structure is an air gap.

14. The polarization switch of claim 1, wherein the thermal isolation structure includes at least one of an oil, a grease, or an adhesive.

15. A high power handling polarization system, comprising:
a first optical assembly operable to receive light, comprising:
a first substrate operable to receive light;
a first polarizer adjacent to the first substrate and operable to receive light from the first substrate;
a planarization layer adjacent to the first polarizer;
a second optical assembly operable to receive light from the first optical assembly, comprising:
a second substrate located to receive light from the planarization layer of the first optical assembly;
a first liquid crystal cell located subsequent in the light path to the second substrate;
a second liquid crystal cell located to receive light from the first liquid crystal cell;
a third substrate located subsequent in the light path to the second liquid crystal cell; and
a thermal isolation structure located between the first optical assembly and the second optical assembly.

16. The high power handling polarization system of claim 15, wherein the first polarizer is an iodine polarizer.

17. The high power handling polarization system of claim 15, wherein the first and second liquid crystal cells comprise pi-cells.

18. The high power handling polarization system of claim 15, wherein the thickness of the thermal isolation structure is in the approximate range of 0.5-10 mm.

19. The high power handling polarization system of claim 15, wherein the planarization layer is approximately index-matched to the first polarizer surface.

20. The high power handling polarization system of claim 15, wherein the thermal isolation structure includes at least one of an oil, a grease, or an adhesive.

* * * * *